US008732659B2

(12) United States Patent
Oi

(10) Patent No.: US 8,732,659 B2
(45) Date of Patent: *May 20, 2014

(54) METHOD, APPARATUS AND STORAGE MEDIUM FOR CUSTOMIZING APPLICATION

(71) Applicant: Canon Kabushiki Kaisha, Tokyo (JP)

(72) Inventor: Hirokazu Oi, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/896,041

(22) Filed: May 16, 2013

(65) Prior Publication Data

US 2013/0246999 A1 Sep. 19, 2013

Related U.S. Application Data

(63) Continuation of application No. 12/167,067, filed on Jul. 2, 2008, now Pat. No. 8,464,212.

(30) Foreign Application Priority Data

Jul. 27, 2007 (JP) .................................. 2007-196014

(51) Int. Cl.
*G06F 9/44* (2006.01)

(52) U.S. Cl.
USPC ........................... 717/107; 717/106; 717/108

(58) Field of Classification Search
None
See application file for complete search history.

(56) References Cited

U.S. PATENT DOCUMENTS

| 5,339,424 | A | * | 8/1994 | Fushimi ........................ 717/146 |
| 5,937,201 | A | * | 8/1999 | Matsushita et al. ............ 713/310 |
| 7,367,015 | B2 | * | 4/2008 | Evans et al. .................... 717/110 |
| 7,490,183 | B2 | | 2/2009 | Branigan et al. | |
| 7,941,454 | B2 | | 5/2011 | Chessell | |
| 2005/0125809 | A1 | * | 6/2005 | Chessell ........................ 719/318 |
| 2005/0183096 | A1 | * | 8/2005 | Branigan et al. .............. 719/328 |
| 2008/0103363 | A1 | | 5/2008 | Levy et al. | |
| 2009/0103535 | A1 | * | 4/2009 | McCoy et al. ................. 370/392 |

FOREIGN PATENT DOCUMENTS

| JP | 3-164934 A | 7/1991 |
| JP | 6-4477 A | 1/1994 |
| WO | 2004/028182 A1 | 4/2004 |

OTHER PUBLICATIONS

Poellabauer, C., et al., "Flexible Cross-Domain Event Deliver for Quality-Managed Multimedia Applications", Transactions on Multimedia Computing, Communications and Applications, vol. 1, No. 3, ACM, pp. 248-268, Aug. 2005.

Underwood, K., et al., "FPGAs vs. CPUs: Trends in Peak Floating-Point Performance", Sandia National Laboratories, ACM, 10 pages, 2004.

Zimmer, C., et al., "Facilitating Compiler Optimizations Through the Dynamic Mapping of Alternate Register Structures", Computer Science Dept., Florida State Univ., ACM, pp. 165-169, 2007.

Roman, M., et al., "Application Mobility in Active Spaces", Univ. Illinois at Urbana-Champaign, 10 pages, 2002.

* cited by examiner

*Primary Examiner* — Matt Kim
*Assistant Examiner* — Hua Lu
(74) *Attorney, Agent, or Firm* — Fitzpatrick, Cella, Harper & Scinto

(57) ABSTRACT

An application registers a first component used by the application with a customizing mechanism, and a component setting unit notifies the customizing mechanism of a second component corresponding to the first component. In accordance with changeover of the second component corresponding to the first component by the component setting unit, the first component executes process using the second unit after the second unit has been changed over.

12 Claims, 12 Drawing Sheets

FIG. 3

APPLICATION LIST ~300

| APPLICATION NAME | APPLICATION ID |
|---|---|
| App 1 | 0001 |
| ....... | ....... |

FIG. 4

MAIN-COMPONENT CORRESPONDENCE TABLE ~600

| MAIN-COMPONENT NAME | MAIN-COMPONENT TYPE | MAIN-COMPONENT CLASS NAME |
|---|---|---|
| Panel 1 | AbstractPanel | SimplePanel |
| Panel 2 | AbstractPanel | FancyPanel |
| ....... | ....... | ....... |

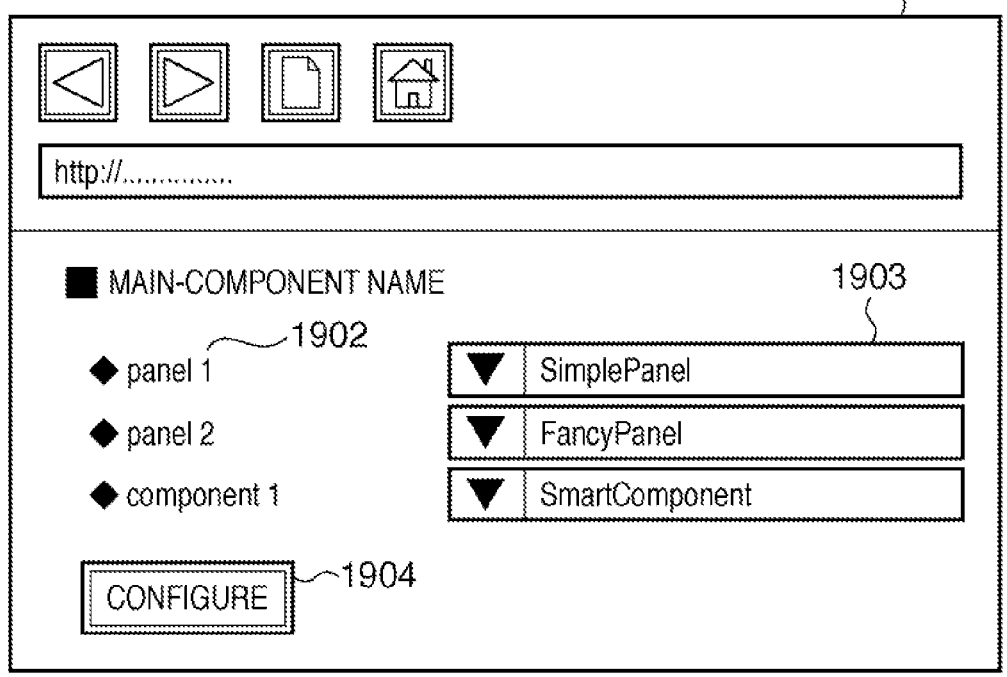
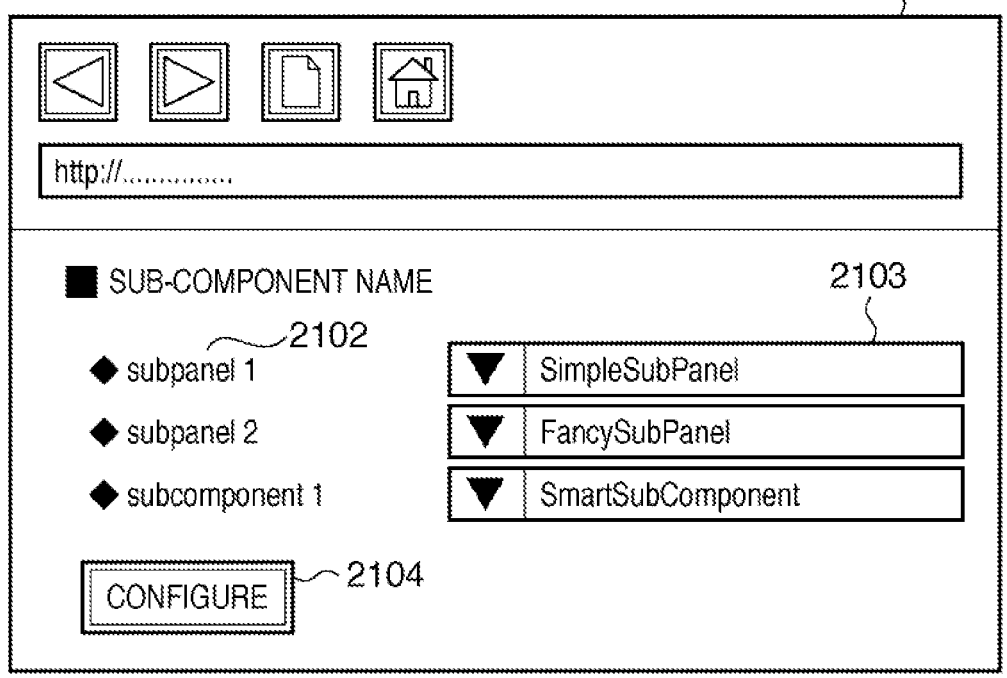

METHOD, APPARATUS AND STORAGE MEDIUM FOR CUSTOMIZING APPLICATION

This application is a continuation of U.S. application Ser. No. 12/167,067, filed Jul. 2, 2008 (pending), the contents of which are incorporated herein by reference.

BACKGROUND OF THE INVENTION

1. Field of the Invention

The present invention relates to a method, apparatus and storage medium for customizing an application.

2. Description of the Related Art

Applications for implementing functions using components exist. Such applications include one in which the components used can be changed over (e.g., see the specifications of Japanese Patent Application Laid-Open Nos. 6-4477 and 3-164934). There are also techniques in which a plug-in mechanism is used in order to extend the functionality of a platform (e.g., see the specification of WO 04/028182).

With the methods disclosed in Japanese Patent Application Laid-Open Nos. 6-4477 and 3-164934, the application side need not know when a component has been changed over. Conversely, however, since the component changeover timing cannot be determined, processing requiring execution in accordance with the component changeover cannot be executed. For example, when the component changeover is executed the application is not able to discard an old component and create a new component. Also, in a case where a new component is a component that provides a GUI, the application is not able to render a screen again using this component.

If the software structure is one that merely changes over a call pointer, there may be little need for processing conforming to such component changeover. However, in the case of an objected-oriented software structure, there is an interaction between an application and a component and between one component and another and it becomes necessary to execute some process in accordance with component changeover.

Conventionally, in instances where continuing to use an old component leads to problems, an operation such as re-booting the application after the component changeover is performed to thereby dispense with the old component and use the new component.

More specifically, it has not been possible to achieve both dynamic changeover of components, in which a component is changed over with the application running as it is, and execution of process responsive to the component changeover. The same holds true with regard to the technique using the plug-in mechanism disclosed in WO 04/028182.

SUMMARY OF THE INVENTION

The present invention enables realization of processing conforming to changeover of a component even if an application cannot ascertain the details of the component changeover.

One aspect of the present invention provides a method of customizing an application comprising the steps of: registering, in an application, a first component used by the application with a customizing mechanism; notifying, in a component setting unit, the customizing mechanism of a second component corresponding to the first component; and executing, in the first component, process using the second component after a changeover thereof, in accordance with changeover of the second component corresponding to the first component by the component setting unit.

Another aspect of the present invention provides an apparatus for customizing an application, comprising: a setting unit configure to set a second component corresponding to a first component used by an application; and a notification unit configure to notify the first component of the second component that has been set; wherein the first component comprises a unit configure to execute process using the second component after a changeover thereof, in accordance with changeover of the second component corresponding to the first component.

Still another aspect of the present invention provides a storage medium storing a computer program for customizing an application, wherein the computer program comprises the steps of: registering a first component used by the application with a customizing mechanism; notifying the customizing mechanism of a second component corresponding to the first component; and executing process using the second component after a changeover thereof, in accordance with changeover by a component setting unit of the second component corresponding to the first component.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3 is a diagram illustrating an example of an application list;

FIG. 4 is a diagram illustrating an example of a main-component correspondence table;

FIG. 13 is a diagram illustrating an example of display of a main-component selection page; and FIG. 14 is a diagram illustrating an example of display of a sub-component selection page.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
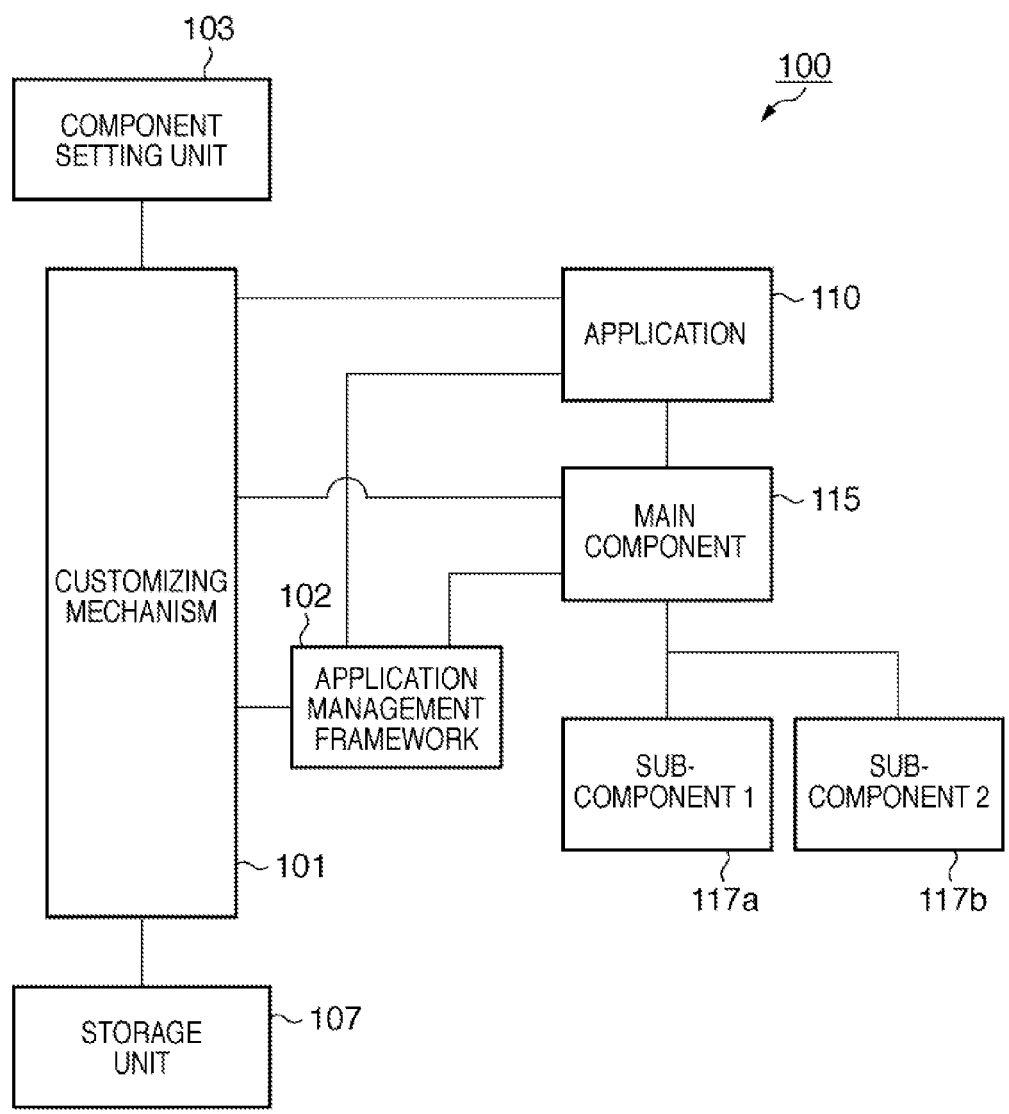
FIG. 1 is a block diagram illustrating the functional configuration of an information processing apparatus according to an embodiment of the present invention.

The configuration of an information processing apparatus according to an embodiment of the present invention will be described with reference to the block diagram of FIG. 1. The information processing apparatus may be implemented by a single computer or upon dispersing various functions among multiple computers as necessary. In a case where the apparatus is composed of multiple computers, the computers would be interconnected as by a local area network (LAN) so as to be capable of communicating with one another.

An information processing apparatus 100 shown in FIG. 1 includes a customizing mechanism 101 that implements a function for customizing application software (shortened to "application" below) by component changeover; an application management framework 102 for managing the application; a component setting unit 103 for setting a component at the time of component changeover or at the initial setting of a component; and a storage unit 107 for storing various lists and tables, described later.

An application 110 is the unit of management of the application management framework 102. The application management framework 102 installs one to a plurality of applications 110 in the information processing apparatus 100 and performs overall life-cycle management inclusive of start, terminate and un-install.

A main component 115 is a software component, and the application 110 is capable of using this software component.

A software component is a group of programs and performs functions of some kind. If viewed from a program on the side that employs this program, the program, which implements a certain function, is a component. When a certain system is implemented, it is essential that an interface be clearly determined in order that the component will be one that is easy to use. A component therefore usually takes on a form generally referred to as a module, subroutine or class, etc.

A sub-component 117 is a software component, and the main component 115 is capable of using the sub-component 117.

One to a plurality of main components 115, one to a plurality of sub-components 117 or combinations thereof are all units of management of the application management framework 102. The application management framework 102 is capable of installing one to a plurality of main components 115, one to a plurality of sub-components 117 or combinations thereof in the information processing apparatus 100 and of un-installing the same. Since they are components, they are not started or terminated by the application management framework 102. If installed, however, they can be used from within the application 110. Even if the application 110 does not use the sub-component 117 directly, it can use it indirectly through the main component 115.

Figure 2:
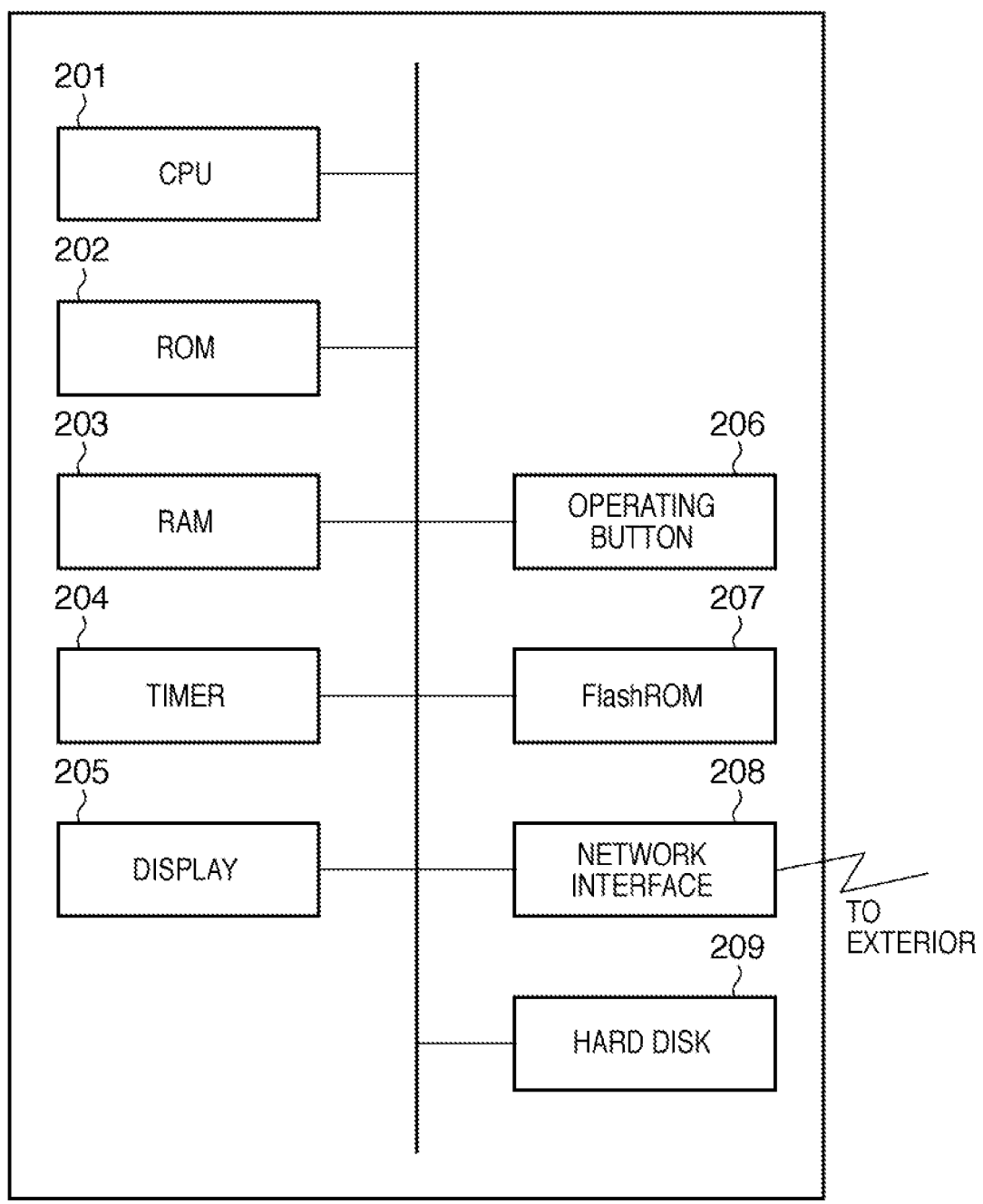
FIG. 2 is a block diagram illustrating the hardware configuration of an information processing apparatus according to an embodiment of the present invention.

The hardware configuration of the information processing apparatus 100 in this embodiment is as illustrated in the block diagram of FIG. 2.

In FIG. 2, a central processing unit (CPU) 201 controls the overall apparatus. A ROM 202 stores various operation programs in readable form, and a RAM 203 is used to store temporary values during the running of a program. A timer 204 measures various times, and a display 205 displays a user interface. Input unit 206 such as a keyboard and mouse are provided, and a non-volatile flash ROM 207 stores various set-data files. A network interface 208 is for making a connection to an external device. A hard disk 209 stores various operation programs and set-data files.

The component setting unit 103 corresponds to the display 205 and input unit (operating button) 206. The customizing mechanism 101 and application management framework 102 are functions loaded into the RAM 203 from the hard disk 209 as necessary and are implemented by being executed by the CPU 201. The storage unit 107 corresponds to a partial storage area of the hard disk 209 or RAM 203. The application 110, main component 115 and sub-component 117 are programs and data stored in the hard disk 209 or RAM 203.

Figure 5:
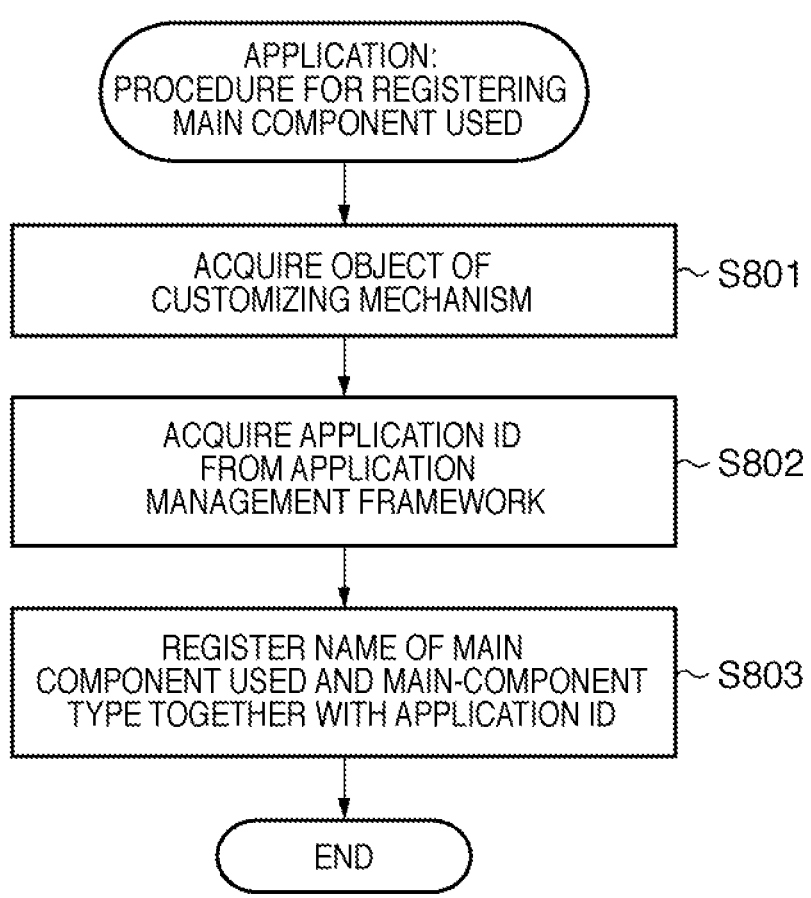
FIG. 5 is a flowchart illustrating a procedure executed by an application to register a main component used.

Next, reference will be had to the flowchart of FIG. 5 to describe a procedure executed by the application 110 to register a main component used. This registration procedure is executed attendant upon installation or start-up of the application 110.

First, the application 110 acquires an object of the customizing mechanism 101 (S801). This is achieved by requesting the customizing mechanism 101 for acquisition of the object.

Next, the application 110 acquires an application ID from the application management framework 102 (step S802). The application ID is for distinguishing the application 110 per se from other applications. A plurality of the applications 110 can be installed in the information processing apparatus 100, as described above. The application management framework 102 endows each application with an application ID to thereby identify the application. The application 110 is capable, at any time, of acquiring the application ID that has thus been assigned to itself.

FIG. 3 is a diagram illustrating an example of an application list 300 indicating a list of applications 110 that have been installed in the information processing apparatus 100. The application list 300 has been stored in the storage unit 107.

When applications 110 are installed, the names of the applications 110 are stored under an application-name item 310 in the application list. The application IDs that have been assigned to these applications are stored under an application-ID item 320. When there is a request for an application ID from an application 110, the application management framework 102 refers to the application list 300 and replies with the corresponding application ID.

Next, along with the application ID, the application 110 registers the name of the main component used by the application and the main component type with the customizing mechanism 101 (S803). Registration is performed by calling the method of the object of the customizing mechanism 101 obtained at S801. In this embodiment, request or notification from one software block (e.g., application 110) to another software block (e.g., the customizing mechanism 101) is carried out by calling the object method. Although this is a method in line with an object-oriented architecture, it may be performed by another method such as calling of a function, pipe communication or socket communication, and the present invention is not limited to an object-oriented architecture.

The main-component name and main-component type registered by the above-described procedure for registering a main component used are stored in a main-component correspondence table 600 shown in FIG. 4. The main-component correspondence table 600 is provided for every application 110 and is stored in the storage unit 107.

In order to indicate what a main-component name and main-component type are, an example using Java language [Java is the trademark or registered trademark of Sun Microsystems Inc. (USA) in the USA and other countries] is illustrated. The following is code (referred to as "Code 1" below) relating to main-component object generation in the application 110:

AbstractPanel panel=(AbstractPanel)customize.createComponent(appID, "panel1);

A main-component name is a name for identifying a main-component object seen from the application 110. In Code 1, panel1 is the name.

A main-component type is information representing the type of main component 115 but need not be the real type of the component. In a system constructed in such a manner that the application 110 and component are not dependent upon each other in the first place, the application 110 naturally does not know the real type of the component. Accordingly, if the language is Java language, then the main-component type may be an abstract type, such as an interface or abstract class. In Code 1, AbstractPanel corresponds to this main-component type.

In this case, as to what the main component per se is, if focus is placed on type information, then it is the Java class, which implements the main-component type. If focus is placed on the aspect of substance at the time of execution, then it is a Java instance.

When the main-component name and main-component type are registered at S803, the customizing mechanism 101 stores the given main-component name under main-component name item 610 in main-component correspondence table 600. Furthermore, the customizing mechanism 101 stores the given main-component type under main-component type item 620.

Figure 6:
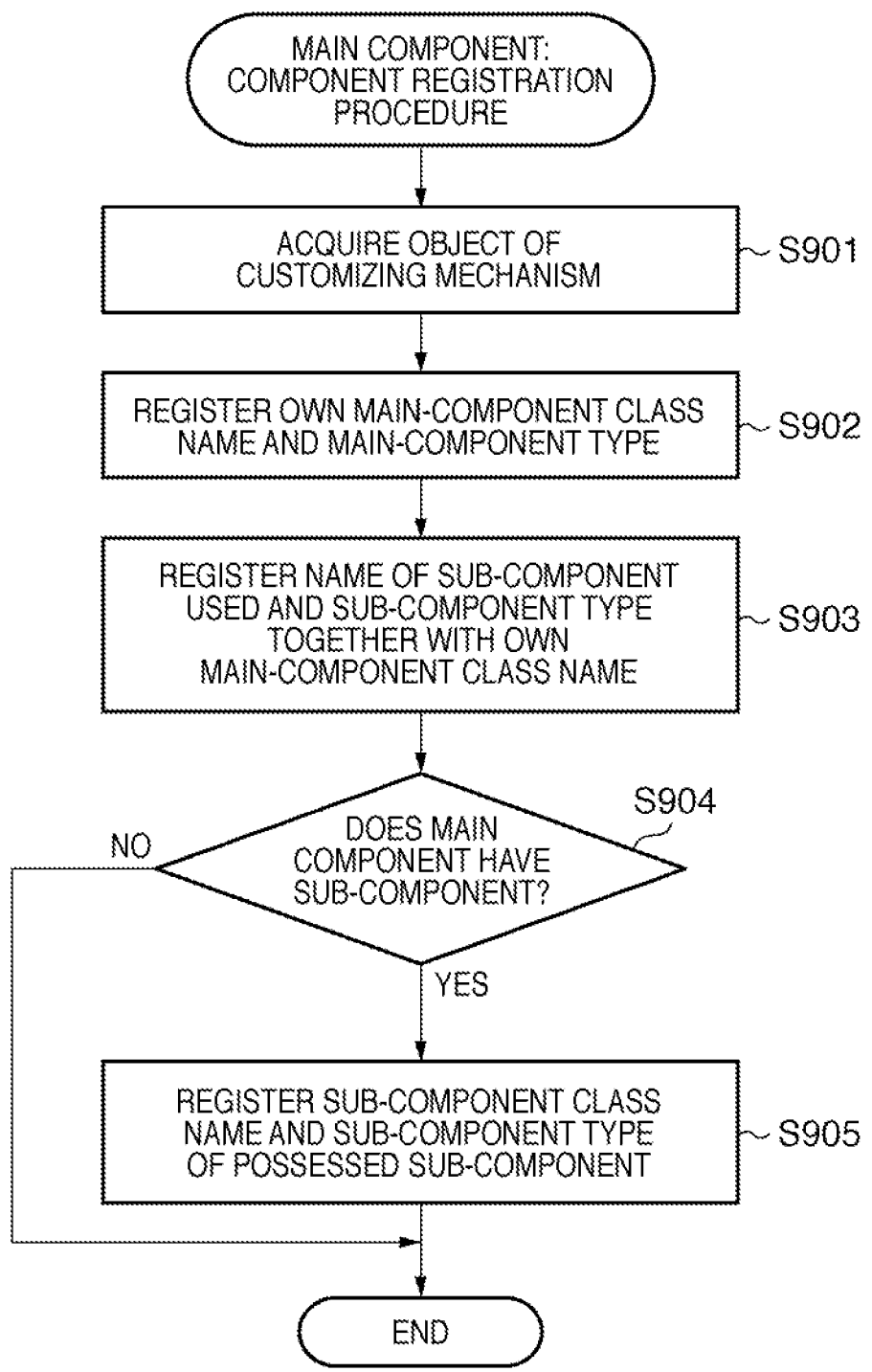
FIG. 6 is a flowchart illustrating a component registration procedure executed by a main component.

Next, reference will be had to the flowchart of FIG. 6 to describe a component registration procedure executed by the main component 115. This procedure is executed attendant upon installation of the main component 115.

First, the main component 115 acquires the object of the customizing mechanism 101 (S901).

Next, the main component 115 registers its own main-component class and main-component type with the customizing mechanism 101 (S902). The main-component class name is a name indicating the implementing type of the main component 115. The customizing mechanism 101 stores the registered main-component class name and main-component type under a main-component class name item and main-component type item in a main-component list, not shown. The main-component list has been stored in the storage unit 107.

Next, using its own main-component class name as a parameter, the main component 115 registers the sub-component name and type used by the main component 115 with the customizing mechanism 101 (S903).

The customizing mechanism 101 stores the registered sub-component name and sub-component type under a sub-component class name item and sub-component type item in a sub-component correspondence table, not shown. The sub-component correspondence table is provided for every main component 115 and has been stored in the storage unit 107.

In other words, hereafter the terminology relating to the sub-component 117 is made to correspond that of the main-component name, main-component type and main-component class name, and the counterparts will be referred to as "sub-component name", "sub-component type" and "sub-component class name". Further, the relationship between the main component 115 and sub-component correspondence table is similar to the relationship between the application 110 and main-component correspondence table 600.

The following illustrates an example of code (referred to as "Code 2") at the time of generation of the sub-component 117 in the main component 115:

AbstractSubPanel subpanel=(AbstractSubPanel)customize.createSubComponent ("SimplePanel", "subpanel1");

Here subpanel1 is the sub-component name and AbstractSubPanel is the sub-component type. SimplePanel is the main-component class name for identifying the main component 115.

Next, the main component 115 determines whether its own installation package (the unit of installation by the application management framework 102) contains the sub-component 117 (S904).

If it is determined that the package has the sub-component 117, then the main component 115 registers the sub-component class name and sub-component type of the contained sub-component 117 with the customizing mechanism 101 (S905).

The customizing mechanism 101 stores the registered sub-component class name and sub-component type under a sub-component class name item and sub-component type item of a sub-component list, not shown.

Next, a procedure executed by the sub-component 117 to register a component will be described. This procedure assumes a case where the sub-component 117 is located in an installation package different from that of the main component 115. The procedure is executed attendant upon installation of the sub-component 117. It should be noted that in a case where the sub-component 117 is located in the installation package of the main component 115, it is registered at S905 of FIG. 6, as described above.

First, the sub-component 117 acquires the object of the customizing mechanism 101. Next, the sub-component 117 registers the possessed sub-component class name and sub-component type with the customizing mechanism 101. These are stored in the above-mentioned sub-component list in a manner similar to that described above.

Figure 7:
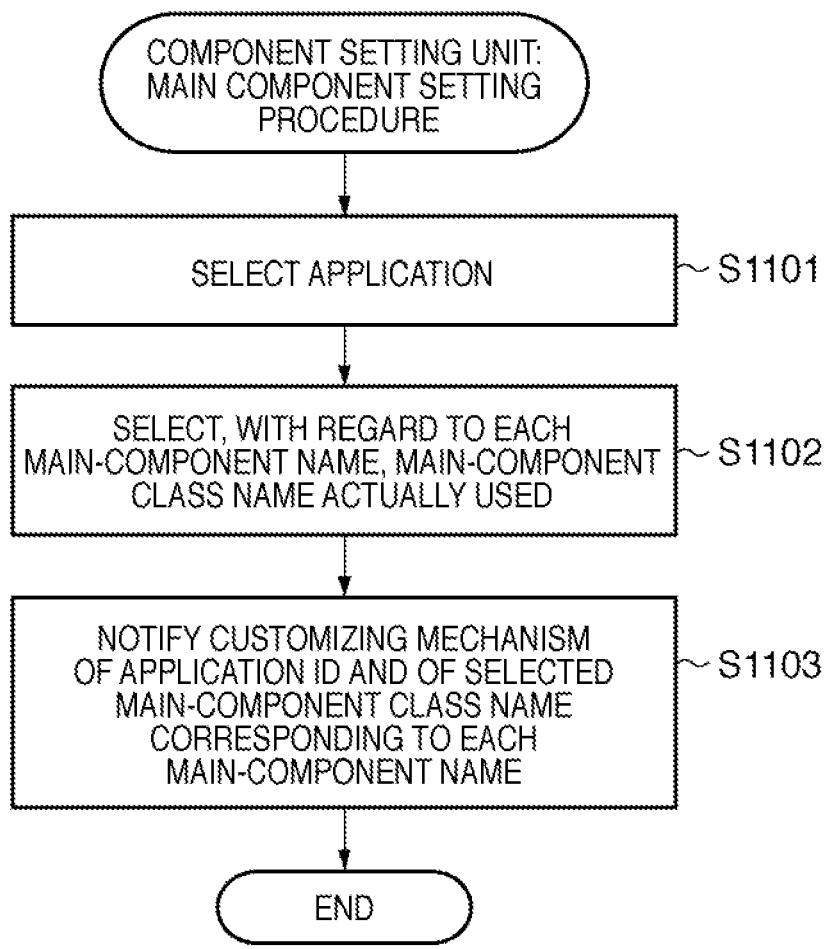
FIG. 7 is a flowchart illustrating a main-component setting procedure executed by a component setting unit.

Next, reference will be made to the flowchart of FIG. 7 to describe a procedure executed by the component setting unit 103 to set a main component.

The component setting unit 103 performs various settings utilizing a user interface displayed on the display 205. For example, although setting is performed using a web browser, the present invention is not limited to this example. Specifically, the component setting unit 103 sends a remotely located external computer (external device) a web page (screen information) for a setting operation and causes the web page to be displayed on the external computer. Information indicating a main component or sub-component selected using the external computer is received by the component setting unit 103 and the selected main component or sub-component is set as a changed-over main component or sub-component.

In the procedure for setting a main component, first the user selects the application 110 for which the main component 115 is to be set (S1101). Specifically, at this time the user performs a setting operation using an application list screen displayed on the display 205. An application list is displayed in the application list screen. The customizing mechanism 101 extracts and acquires application names from the application list 300 registered with the customizing mechanism 101. The application names acquired are displayed on the application list screen. The user selects one application 110 from the displayed application list and presses a setting button.

Based on the application 110 selected by the user, the customizing mechanism 101 displays a page that allows selection of the main component 115. An example of display of a main-component selection screen 1901 is illustrated in FIG. 13. In FIG. 13, a list 1902 of names of main components used by the selected application 110 is displayed, and so are names 1903 of classes of main components that have been selected in correspondence with respective ones of the names of the main components.

The list 1902 of main-component names is acquired from main-component name 610 in main-component correspondence table 600 of FIG. 4 registered by the application. Although the main-component class name 1903 that has been selected is acquired from the main-component class name 630 in the same table, nothing will have been registered under main-component class name 630 when a setting is first made. Accordingly, the display of the main-component class name 1903 that has been selected is blank initially. However, the main-component class for which the main-component type is the same as the main-component type 620 and which has been registered in the main-component list at the time of installation of the main component is a selection candidate for the main-component class to be registered. This main-component class name is embedded in the web page, which is transmitted from the customizing mechanism 101, as the selection candidate for the main-component class to be registered in the selected application 110. For example, the main-component type corresponding to the main-component name panel1 is AbstractPanel, which is found by referring to the main-component type 620 in FIG. 4. Further, as a result of the processing at S902 in FIG. 6, it is assumed that SimplePanel and FancyPanel have been stored in the main-component list (not shown) as main-component class names corresponding to the main-component type AbstractPanel. In such case, SimplePanel and FancyPanel are the selection candidates, and the user can select one of these by operating a list box in the web page.

By using the user interface set forth above, the user selects, with regard to each main-component name, the main-component class name actually used (S1102).

If a "CONFIGURE" button 1904 is pressed by the user, then the component setting unit 103 notifies the customizing mechanism 101 of the application ID of the selected application 110 and of the selected main-component class name that corresponds to each main-component name (S1103).

The main-component setting procedure executed by the customizing mechanism 101 at this time will be described next. The customizing mechanism 101 accepts the application ID and the main-component class name that corresponds to each main-component name from the component setting unit 103.

The customizing mechanism 101 obtains the corresponding main-component correspondence table 600 from the application ID and stores the accepted main-component class name under the main-component class name 630 corresponding to each main-component name.

Figure 11:
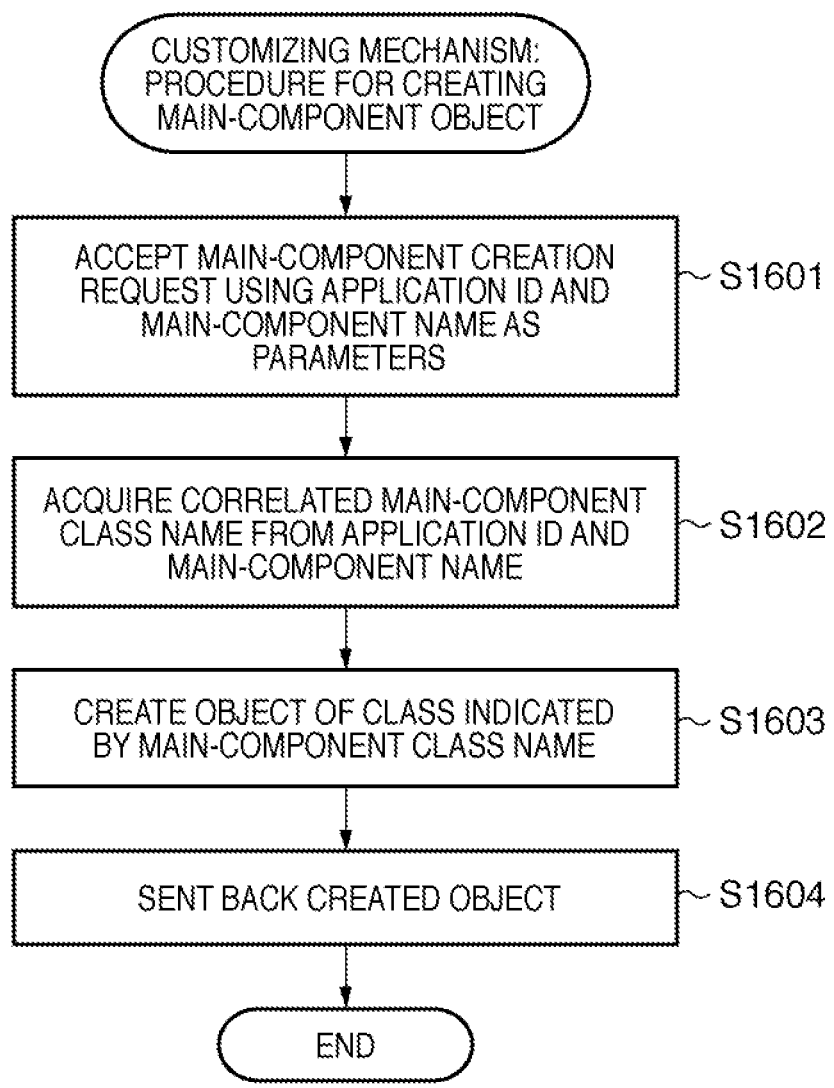
FIG. 11 is a flowchart illustrating a main-component object creation procedure executed by a customizing mechanism.

Next, reference will be had to the flowchart of FIG. 11 to describe a main-component object creation procedure executed in the customizing mechanism 101. It is the application 110 that requests creation of the main-component object. A typical example of this creation request is the above-mentioned Code 1.

First, with the application ID and main-component name serving as parameters, the customizing mechanism 101 accepts the request for main-component creation (S1601).

Next, the customizing mechanism 101 acquires the correlated main-component class name from the application ID and main-component name (S1602). This is performed using the main-component correspondence table 600.

The customizing mechanism 101 creates the object of the class indicated by the main-component class name that has been obtained (S1603).

The customizing mechanism 101 sends the created object back to the application 110 (S1604).

Figure 8:
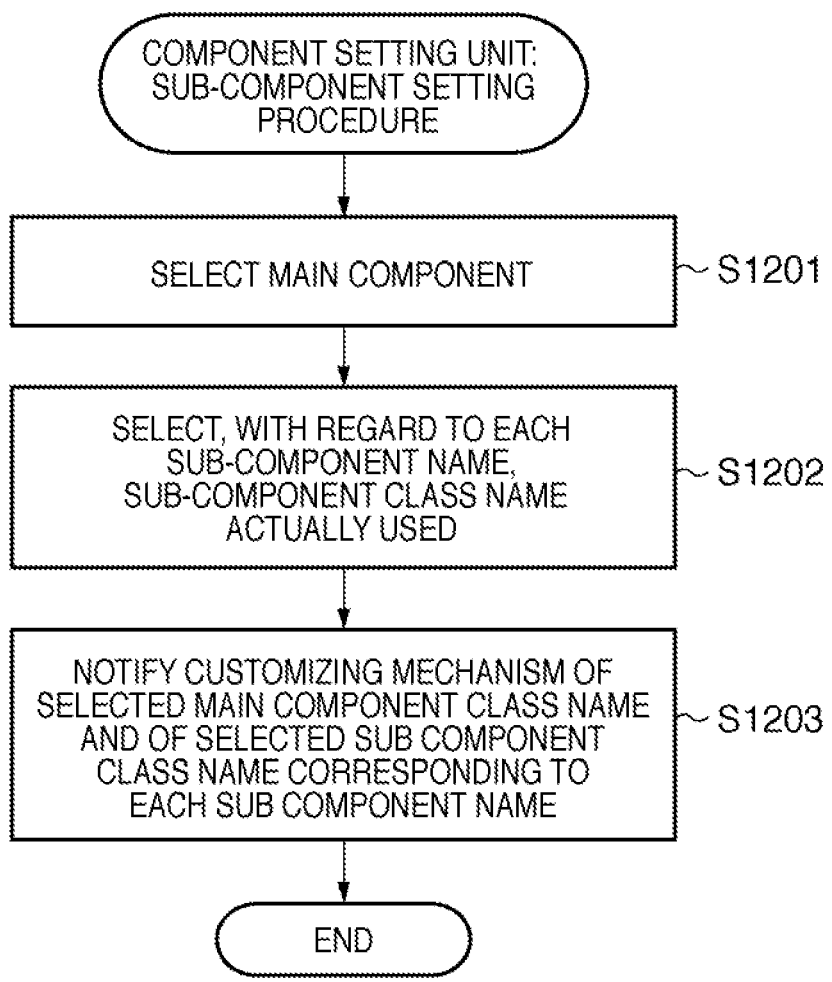
FIG. 8 is a flowchart illustrating a sub-component setting procedure executed by a component setting unit.

Next, reference will be had to the flowchart of FIG. 8 to describe a sub-component setting procedure executed by the component setting unit 103.

First, the user selects the main component 115 for which the sub-component 117 is to be set (S1201). Specifically, at this time a screen of the list of main-component class names manipulated by the user is displayed on the display 205 as a result of the customizing mechanism 101 extracting and obtaining main-component classes from the main-component list. As a result of the processing at S902 in FIG. 6 at the time of installation of the main component, main-component class names and main-component types have been stored in the main-component list. The user selects one main component 115 from the list of main-component class names displayed on the screen of the list of main-component class names and then presses the setting button.

Based on the main component 115 selected by the user, the customizing mechanism 101 displays a page that allows the sub-component 117 to be selected next. FIG. 14 illustrates an example of display of a sub-component selection page 2101. In FIG. 14, a list 2102 of names of sub-components used by the selected main component 115 is displayed, and so are names 2103 of classes of sub-components that have been selected in correspondence with respective ones of the names of the sub-components.

The list 2102 of sub-component names is acquired from the sub-component name item of the sub-component correspondence table of the main component registered in the step S903 of FIG. 6 when the main component is installed. Although the sub-component class name 2103 that has been selected is acquired from the sub-component class name item in the same table, there are occasions where nothing will have been registered under sub-component class name item when a setting is first made. In such case the display of the sub-component class name 2103 that has been selected is blank initially. However, the sub-component class for which the sub-component type is the same as the sub-component type item registered with the sub-component correspondence table and which has been registered with the sub-component list at the time of installation is a selection candidate for the sub-component class to be registered. This sub-component class name is embedded in the web page, which is transmitted from the customizing mechanism 101, as the selection candidate for the sub-component class to be registered with the selected main component 115. The sub-component name and the sub-component type used by the main-component are registered with sub-component correspondence table. For example, it is assumed that what has been registered as the sub-component type corresponding to the sub-component subpanel1 is AbstractSubPanel, which is found by referring to the sub-component type item in sub-component correspondence table. Further, if reference is had to the sub-component list, SimpleSubPanel and FancySubPanel exist as sub-component class names corresponding to the sub-component type AbstractSubPanel. In such case, SimpleSubPanel and FancySubPanel are the selection candidates, and the user can select one of these by operating the list box in the web page.

By using the user interface set forth above, the user selects, with regard to each sub-component name, the sub-component class name actually used (S1202).

If a "CONFIGURE" button 2104 is pressed by the user, then the component setting unit 103 notifies the customizing mechanism 101 of the main-component class name indicating the selected main component 115 and of the selected sub-component class name that corresponds to each sub-component name (S1203).

Figure 9:
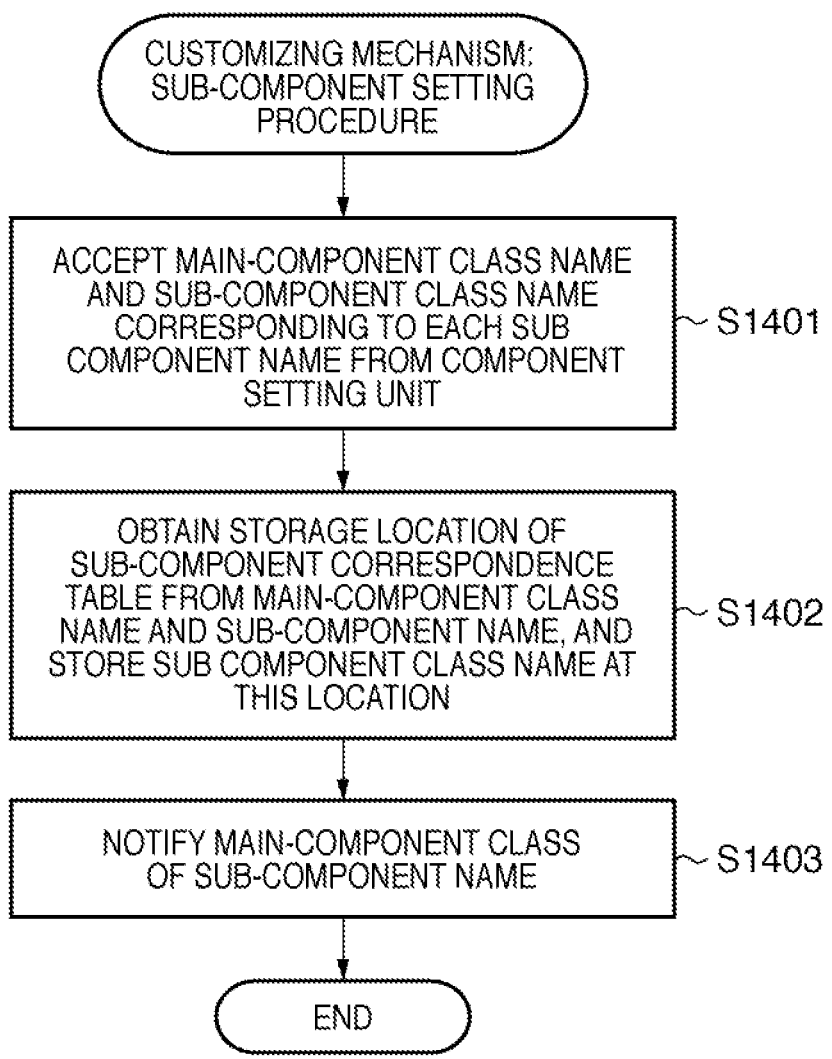
FIG. 9 is a flowchart illustrating a sub-component setting procedure executed by a customizing mechanism.

The sub-component setting procedure executed by the customizing mechanism 101 at this time will be described next with reference to the flowchart of FIG. 9.

The customizing mechanism 101 accepts the main-component class name and the sub-component class name that corresponds to each sub-component name from the component setting unit 103 (S1401).

The customizing mechanism 101 obtains the corresponding sub-component correspondence table, which was registered at the time of installation of the main component, from the main-component class name. The customizing mechanism 101 then stores the accepted sub-component class name under the sub-component class name item corresponding to each sub-component name of the sub-component correspondence table (S1402).

The customizing mechanism 101 notifies the main-component class, which is indicated by this main-component class name, of the sub-component name that has been set or updated (S1403).

Figure 10:
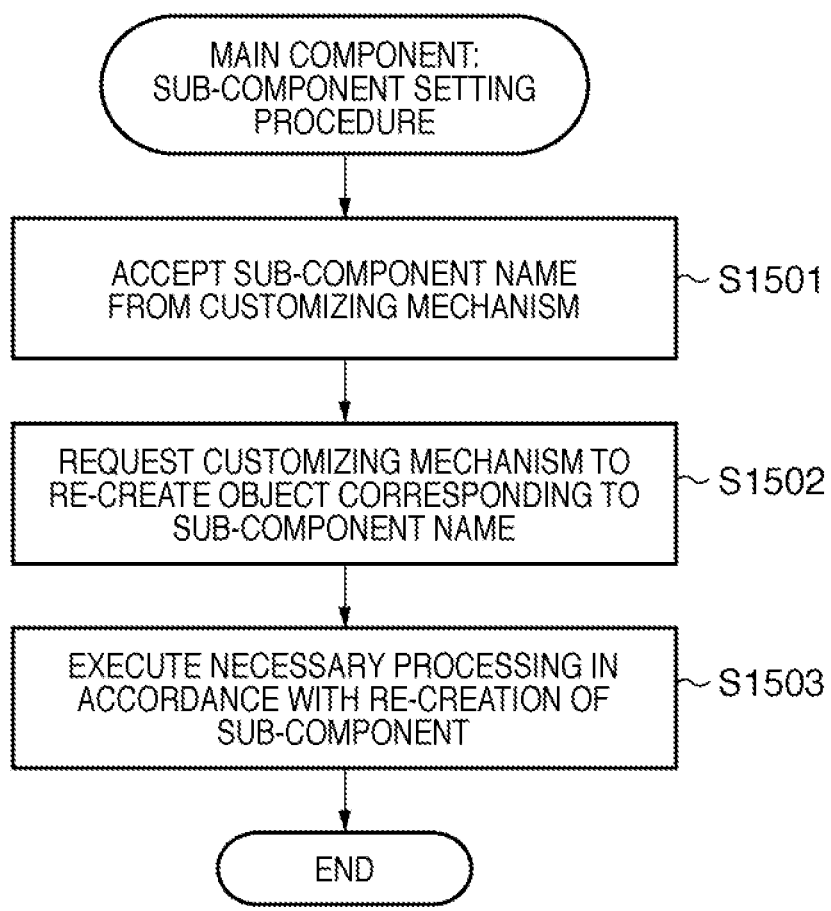
FIG. 10 is a flowchart illustrating a sub-component setting procedure executed by a main component.

Reference will be had to the flowchart of FIG. 10 to describe a sub-component setting procedure executed by the main component 115 at this time.

First, the main component 115 accepts the sub-component name from the customizing mechanism 101 (S1501).

Next, the main component 115 requests the customizing mechanism 101 to again create an object corresponding to this sub-component name (S1502). The specific procedure for creating the object of the sub-component 117 will be described later.

Although, in the above example, the object of the sub-component 117 is created by the customizing mechanism 101, the main component 115 may create it. In that case, the procedure of FIG. 9 and FIG. 10 are changed as following. In the step S1403 of FIG. 9 the customizing mechanism 101 notifies the main component class of the sub-component name and the sub-component class name. In the step S1501 of FIG. 10 the main component 115 receives the sub-component name and the sub-component class name from the customizing mechanism 101. Furthermore, in the step S1502, the main component 115 creates the object of the sub-component.

After the sub-component 117 has been created again, the main component 115 executes processing necessary in accordance with this re-creation of the sub-component (S1503). Specifically, in a case where there is a changeover from a sub-component 117a to a sub-component 117b and objects of the sub-component 117a all become unnecessary after the changeover, the main component 115 executes processing to discard the objects of the sub-component 117a. Alternatively, the main component 115 replaces the content of a variable holding an object of the sub-component 117a with the component of the sub-component 117b and executes processing using the sub-component 117b after the changeover. Furthermore, in a case where the GUI provided by the sub-component 117a and the GUI provided by the sub-component 117b differ, the main component 115 executes re-rendering processing in order to render a screen using a new GUI.

In this embodiment, processing conforming to component changeover is executed only when a sub-component is changed over. However, the above-described processing may also be applied when a main component is changed over.

Here the above-mentioned necessary processing executed when the sub-component 117 is changed over will be described with reference to specific examples of a sub-component.

A first example is assumed to be an example of a SimpleSubPanel and FancySubPanel mentioned above. SimpleSubPanel is a sub-panel having a simple external appearance, and FancySubPanel is a sub-panel in which the external appearance of the panel is provided with embellishment. In this case, if the sub-panel is changed, it is necessary to execute screen re-rendering processing in order to notify the user of the fact that a change was made. A button component, etc. having a different external appearance falls within this example.

A second example is an example of a panel component displayed information relating to the user that is logging in system now. Assume that the maximum number of simultaneous log-ins to the system is one. When a certain user has logged in, a changeover to the panel component for this user should be made. Processing that acquires user information for displaying on the panel component becomes necessary. In other words, this processing is initialization processing for the component.

A third example is an example of a case where processing for passing information from an old component to a new component is executed, although this processing is similar to the above-mentioned initialization processing. For instance, in a case where a changeover from an old text field to a new text field is made, processing is executed for acquiring text data that has been input to the old text field and setting this data in the new text field.

A fourth example is an example in which resource-close, so to speak, is performed to stop the use of resources that an old software component has used thus far. For instance, a conceivable example is one in which in a case where an old software component (not limited to a GUI component, and a case where a component is a computation algorithm component is also possible) was using a resource such as a repository or database, the resource that was being used up to that point is closed or shut down at the time of the changeover to the new software component.

Figure 12:
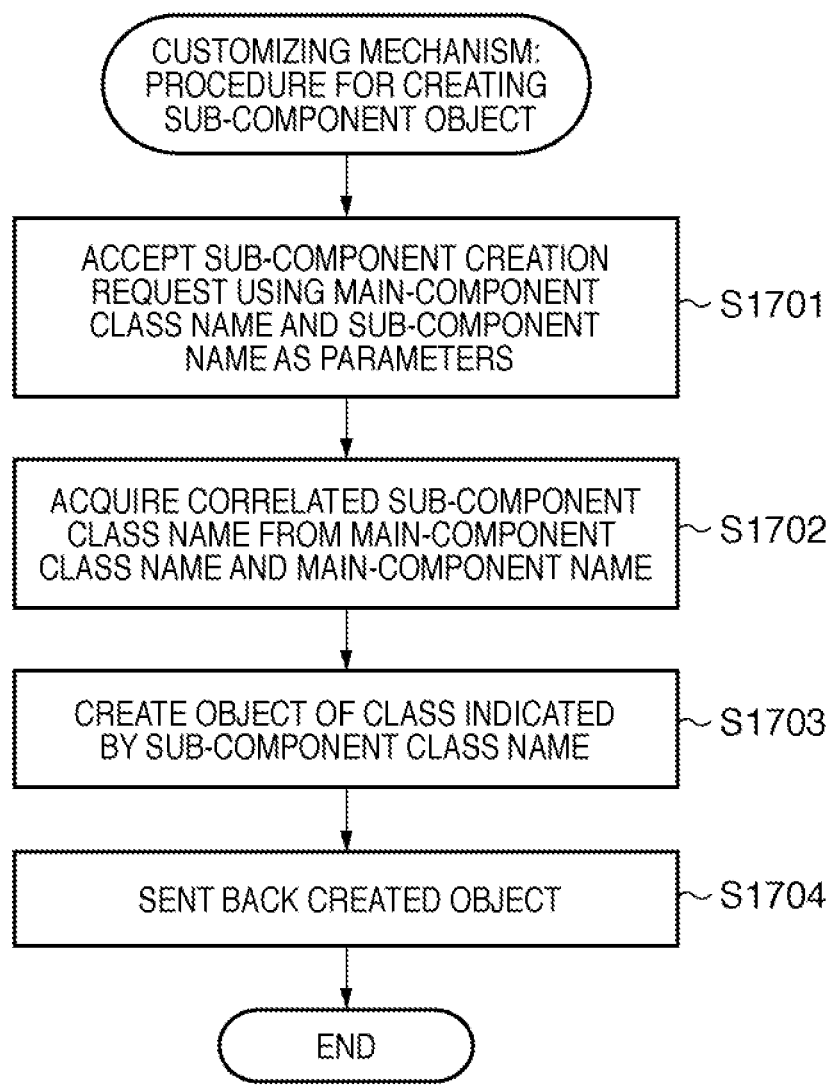
FIG. 12 is a flowchart illustrating a procedure executed by a customizing mechanism for creating a sub-component object.

Next, reference will be had to the flowchart of FIG. 12 to describe a procedure executed by the customizing mechanism 101 for creating a sub-component object. It is the main component 115 that requests creation of the sub-component object. At S1502 in FIG. 10, the main component 115 requests the customizing mechanism 101 to again create an object corresponding to the sub-component name. A typical example of this creation request is the above-mentioned Code 2.

First, the customizing mechanism 101 accepts the sub-component creation request with the main-component class name and sub-component name serving as parameters (S1701).

Next, the customizing mechanism 101 acquires the correlated sub-component class name from the main-component name and sub-component name (S1702). This is performed using the sub-component correspondence table registered at installation of the main component.

The customizing mechanism 101 creates the object of the class indicated by the sub-component class name that has been obtained (S1703).

The customizing mechanism 101 sends the created object back to the main component 115 (S1704).

By way of the procedures of FIGS. 10 and 12, the main component 115 changes over a sub-component 117 and performs an operation using a new sub-component 117 in place of the old sub-component 117. Alternatively, preparations for performing an operation can be made. It is obvious that once such a state has been established, the new sub-component 117 will be used if the application 110 uses the main component 115. The foregoing procedures are attained without re-booting the application 110.

In the embodiment described above, an application manages a main-component name, which is capable of identifying a main component, and a main-component class name, which serves as identification information in terms of implementing the main component, in association with each other, and updates the main-component class name if the main component is changed over. In response to method for the application uses main-component name, the main component is generated based upon the main-component class name after updating, and processing conforming to the changeover of the main component is executed.

In accordance with the above-described embodiment, therefore, an application can implement dynamic changeover of a component even if it does not know whether the component changeover happens, and it is possible to execute processing conforming to the changeover of the component.

Each of the means and steps constituting the embodiment of the present invention described above, can be implemented by running a program that has been stored in a RAM or ROM of a computer. The program and a computer-readable recording medium on which the program has been recorded fall within the scope of the present invention.

Further, the present invention is capable of being worked as, for example, a system, apparatus, method, program or recording medium. Specifically, the present invention may also be applied to an apparatus comprising a single device.

The present invention includes a case where it is attained also by supplying a software program, which implements the functions of the foregoing embodiment, directly or remotely to a system or apparatus, reading the supplied program with a computer of the system or apparatus, and then executing the program.

Accordingly, since the functional processing of the present invention is implemented by computer, the program codes per se installed in the computer also implement the invention. In other words, the present invention also covers a computer program per se that is for the purpose of implementing the functional processing of the invention. In this case, so long as the system or apparatus has the functions of the program, the form of the program, for example, object code, a program executed by an interpreter or script data supplied to an operating system, etc., does not matter.

Further, the functions of the embodiment are implemented by having a computer execute a program that has been read. In addition, an operating system or the like running on the computer performs all or a part of the actual processing based upon the indications in the program. The functions of the foregoing embodiment can be implemented by this processing as well.

Furthermore, as an example of another method, first a program that has been read from a recording medium is written to a memory provided on a function expansion board inserted into the computer or provided in a function expansion unit connected to the computer. A CPU or the like provided on the function expansion board or function expansion unit performs some or all of the actual processing based upon the indications in the program, and the functions of the foregoing embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-196014, filed on Jul. 27, 2007, which is hereby incorporated herein by reference herein in its entirety.

What is claimed is:

1. A method of customizing an application in which a first component used by the application and a second component used by the first component are registered with a customizing mechanism, wherein the first component registers an identifier corresponding to the second component used by the first component with the customizing mechanism, the method comprising steps of:

notifying, by a component setting unit, the customizing mechanism of changeover of a plurality of second components used by the first component; and executing, in accordance with changeover of a second component used by the first component, processing using an object created, by the customizing mechanism which has received the notification, based on the second component after the changeover thereof.

2. The method according to claim 1, wherein:

abstract types of the first component used by the application and abstract types of the second component used by the first component are registered with the customizing mechanism;

the method further comprises causing the customizing mechanism to hold a relationship between abstract types and real types of respective components;

the notifying step comprises notifying the customizing mechanism of the changeover of real types of the plurality of second components managed by the first component; and the executing step comprises executing, in accordance with the changeover of a real type of the second component used by the first component, the processing using the object created, by the customizing mechanism which has received the notification, based on the real type of the second component after the changeover.

3. The method according to claim 2, further comprising executing, when the real type of the second component after the changeover thereof is notified from the customizing mechanism to the first component, processing using the object of the second component after the changeover thereof.

4. The method according to claim 2, further comprising rendering, in accordance with the changeover, by the component setting unit, of the real type of the second component managed by the first component, a display screen using the object of the second component after the changeover.

5. The method according to claim 2, wherein:

an identifier corresponding to the second component used by the first component is registered with the customizing mechanism;

the notifying step comprises notifying the customizing mechanism of the real type of the second component corresponding to the registered identifier; and the executing step comprise executing, in accordance with the changeover, by the component setting unit, of the real type of the second component corresponding to the identifier, the processing using the object created, by the customizing mechanism which has received the notification, based on the real type of the second component after the changeover.

6. The method according to claim 2, wherein:

an identifier corresponding to the second component used by the first component is registered with the customizing mechanism;

the notifying step comprises notifying the customizing mechanism of the real type of the second component, corresponding to the registered identifier, which is selected from the plurality of the second components; and the executing step comprise executing, in accordance with the changeover, by the component setting unit, of the real type of the second component corresponding to the identifier, the processing using the object created, by the customizing mechanism which has received the notification, based on the real type of the second component after the changeover.

7. The method according to claim 2, wherein:
an identifier corresponding to the second component used by the first component is registered with the customizing mechanism;
the notifying step comprises transmitting to an outside identifiers of the plurality of the second components corresponding to the registered identifier, receiving from the outside an identifier of the second component selected from the identifiers of the plurality of second components, and notifying the customizing mechanism of the identifier of the second component selected from the identifiers of the plurality of second components; and
the executing step comprise executing, in accordance with the changeover of the selected identifier of the second component, the processing using the object created, by the customizing mechanism which has received the notification, based on the real type of the second component after the changeover.

8. The method according to claim 2, wherein:
types of the second component used by the first component are registered with the customizing mechanism;
the notifying step comprises notifying the customizing mechanism of a class of the second component which has a type identical to a type of the second component used by the first component;
the method further comprises, in accordance with the changeover of the class of the second component corresponding to the first component, creating, by the customizing mechanism, the object of the second component after the changeover; and
the executing step comprises executing using the object created, by the customizing mechanism which has received the notification, based on the real type of the second component after the changeover.

9. The method according to claim 1, wherein the first component is a main component and the second component is a sub-component.

10. The method according to claim 1, wherein the first and second components are GUI components for rendering GUIs.

11. An apparatus having a processor for customizing an application in which a first component used by the application and a second component used by the first component are registered with a customizing mechanism, wherein the first component registers an identifier corresponding to the second component used by the first component with the customizing mechanism, the apparatus comprising:
a component setting unit configured to notify the customizing mechanism of changeover of a plurality of second components used by the first component; and
an execution unit configured to execute, in accordance with changeover of a second component used by the first component, processing using an object created, by the customizing mechanism which has received the notification, based on the second component after the changeover thereof.

12. A non-transitory computer-readable storage medium storing a computer program for causing a computer to execute steps of a method of customizing an application in which a first component used by the application and a second component used by the first component are registered with a customizing mechanism, wherein the first component registers an identifier corresponding to the second component used by the first component with the customizing mechanism, the method comprising steps of:
notifying, by a component setting unit, the customizing mechanism of changeover of a plurality of second components used by the first component; and
executing, in accordance with changeover of a second component used by the first component, processing using an object created, by the customizing mechanism which has received the notification, based on the second component after the changeover thereof.

* * * * *